US012626620B2

(12) United States Patent
Specht et al.

(10) Patent No.: US 12,626,620 B2
(45) Date of Patent: May 12, 2026

(54) METHOD FOR PROJECTING IMAGE CONTENT ONTO THE RETINA OF A USER, IMAGE PROCESSING DEVICE FOR CARRYING OUT THE METHOD AND AN OPTICAL SYSTEM FOR A VIRTUAL RETINAL SCAN DISPLAY

(71) Applicant: Robert Bosch GmbH, Stuttgart (DE)

(72) Inventors: Hendrik Specht, Pliezhausen (DE); Andreas Petersen, Eningen (DE); Christian Nitschke, Kusterdingen (DE); Mazyar Sabbar, Tuebingen (DE); Nikolai Suchkov, Stuttgart (DE); Tadiyos Alemayehu, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 430 days.

(21) Appl. No.: 18/551,003

(22) PCT Filed: Jul. 8, 2022

(86) PCT No.: PCT/EP2022/069125
§ 371 (c)(1),
(2) Date: Sep. 18, 2023

(87) PCT Pub. No.: WO2023/036496
PCT Pub. Date: Mar. 16, 2023

(65) Prior Publication Data
US 2024/0249653 A1      Jul. 25, 2024

(30) Foreign Application Priority Data
Sep. 8, 2021      (DE) ..................... 10 2021 209 877.0

(51) Int. Cl.
| | | |
|---|---|---|
| *G09G 3/00* | (2006.01) | |
| *G02B 27/01* | (2006.01) | |
| *G06F 3/01* | (2006.01) | |

(52) U.S. Cl.
CPC ......... *G09G 3/001* (2013.01); *G02B 27/0172* (2013.01); *G06F 3/013* (2013.01);
(Continued)

(58) Field of Classification Search
CPC ...................................................... G09G 3/001
See application file for complete search history.

(56) References Cited

U.S. PATENT DOCUMENTS

| | | |
|---|---|---|
| 2016/0377865 A1 | 12/2016 | Alexander et al. |
| 2016/0377866 A1 | 12/2016 | Alexander et al. |
| | (Continued) | |

FOREIGN PATENT DOCUMENTS

| | | |
|---|---|---|
| DE | 102016201567 A1 | 8/2017 |
| JP | H08240786 A | 9/1996 |
| | (Continued) | |

OTHER PUBLICATIONS

International Search Report for PCT/EP2022/069125, Issued Oct. 24, 2022.

*Primary Examiner* — Edmond C Lau
(74) *Attorney, Agent, or Firm* — NORTON ROSE FULBRIGHT US LLP

(57) ABSTRACT

A method for projecting image content onto the retina of a user using an optical system. Image data are captured using the image processing device. A first subset of the image data is blanked, thereby generating an active second subset of image data. The first and second subsets make up the total amount of the image data. The projector unit is controlled using the image data such that there is always only one eye box, generated on a common imaging path, with the same (Continued)

active image data arranged in the region of a first pupil region of the user. The first pupil region surrounds the pupil center. A portion of the eye box is arranged with a portion of the active image data within a second pupil region of the user. The second pupil region surrounds the pupil center. The second pupil region is arranged within the first pupil region.

21 Claims, 11 Drawing Sheets

(52) U.S. Cl.
CPC ................ *G02B 2027/0178* (2013.01); *G09G 2320/0233* (2013.01); *G09G 2354/00* (2013.01)

(56) References Cited

U.S. PATENT DOCUMENTS

| | | | |
|---|---|---|---|
| 2017/0102541 A1 | 4/2017 | Tremblay et al. | |
| 2018/0321494 A1 | 11/2018 | Andrews et al. | |
| 2019/0041648 A1* | 2/2019 | Petersen | ............ G02B 27/0172 |
| 2019/0043392 A1 | 2/2019 | Abele | |
| 2020/0142193 A1* | 5/2020 | Graf | ......................... G02B 3/14 |
| 2021/0199970 A1 | 7/2021 | Huang et al. | |
| 2022/0277675 A1* | 9/2022 | Yanai | ..................... G09G 3/001 |

FOREIGN PATENT DOCUMENTS

| | | | |
|---|---|---|---|
| JP | 2016517036 A | 6/2016 |
| JP | 2018189963 A | 11/2018 |

* cited by examiner

400

401a  401b

402

401c  401d

METHOD FOR PROJECTING IMAGE CONTENT ONTO THE RETINA OF A USER, IMAGE PROCESSING DEVICE FOR CARRYING OUT THE METHOD AND AN OPTICAL SYSTEM FOR A VIRTUAL RETINAL SCAN DISPLAY

FIELD

The present invention relates to a method for projecting image content onto the retina of a user with the aid of an optical system. In addition, the present invention relates to an image processing device for carrying out the method and to an optical system for a virtual retinal scan display having the image processing device.

BACKGROUND INFORMATION

A method for projecting image content onto the retina of a user with the aid of an optical system is described in U.S. Patent Application Publication No. US 2016/0377865 A1.

The distance between the eye pupil and the redirection unit integrated in the spectacle lens can be changed, for example, by shifting the spectacles along the nose, as a result of which the eye pupil no longer lies in the exit pupil plane of the optical system. Because the bundles of beams arising due to the redirection of the light beams onto the eye by means of the redirection unit are considerably fanned out outside the exit pupil plane, double images can occur for the user.

Proceeding from this problem, it is an object of the present invention to develop a method for projecting image content onto the retina of a user, in which double images are avoided largely independently of the distance between the eye pupil and the redirection unit.

SUMMARY

In order to achieve the object, a method for projecting image content onto the retina of a user with the aid of an optical system is provided according to the present invention. In addition, an image processing device according and an optical system for a virtual retinal scan display are provided according to the present invention.

According to an example embodiment of the present invention, the optical system with the aid of which the method for projecting image content onto the retina of the user is carried out has at least one image source, which supplies image content in the form of image data. The image data are in particular in the form of color image data, e.g., RGB image data. In particular, the image data can be in the form of non-moving or moving images, e.g. videos. In addition, the optical system has a projector unit with a temporally modulatable light source for generating at least one light beam and with a controllable deflection device for the at least one light beam for scanning projection of the image content. The projector unit is in particular designed to emit the image content from the image data in the form of scanned and/or rasterized light beams. The deflection device is in particular designed as a MEMS mirror (micromirror actuator), at least for controlled deflection of the at least one light beam of the light source of the projector unit. In addition, the optical system has a redirection unit onto which the image content can be projected and which is designed to direct the projected image content onto an eye of a user. The redirection unit comprises in particular an arrangement of optical elements, for example diffractive, reflective, refractive and/or holographic optical elements. Preferably, however, the redirection unit always comprises at least one holographic optical element. The redirection unit is in particular provided to redirect only a portion of the intensity of the projected image content onto the user's eye. At least a further portion of the intensity of the projected image content passes through the redirection unit. The redirection unit appears substantially transparent to a user at least from a perpendicular viewing direction. In particular, the redirection unit forms a projection region. Furthermore, the optical system comprises an optical segmentation element that is arranged between the projector unit and the redirection unit and is designed to project the image content via at least two different imaging paths onto at least one projection region of the redirection unit. Here, at least some imaging paths are individually controllable. In particular, the complete image content is selectively projected via one of the at least two different imaging paths onto the at least one projection region of the redirection unit at a first point in time. In particular, a first portion of the image data is projected via a first of the at least two different imaging paths at the first point in time, and a second portion of the image data is projected via a second of the at least two different imaging paths at a second point in time, following the first point in time, onto the at least one projection region of the redirection unit. In particular, a first portion of the image data is projected via the first of the at least two different imaging paths, and the second portion of the image data is projected via the second of the at least two different imaging paths onto the at least one projection region of the redirection unit simultaneously at the first point in time. The optical segmentation element can in particular be designed as a spatially segmented optical element, which is provided in particular to carry out a spatial segmentation of the image data. The optical segmentation element can in particular be designed as a temporally segmented optical element. In this way, a good spatial resolution of the reproductions can advantageously be achieved. Furthermore, the optical system comprises an optical replication component, which is arranged in the at least one projection region of the redirection unit and is designed to direct the projected image content onto the eye of the user in a replicated and spatially offset manner, so that a plurality of mutually spatially offset eye boxes with the image content is generated. Such an eye box is in particular arranged on an eye pupil plane of the user and in particular is formed as a section on the eye pupil plane by the bundle of light beams redirected by the redirection unit. The common eye pupil plane can have deviations from a perfect plane, for example by rotatory eye movements, etc. In particular, the eye pupil plane runs approximately in parallel with a surface of a spectacle lens of the smart glasses, in particular with a surface of a portion of the spectacle lens of the smart glasses that reflects the light beams. In particular, the eye box is traversed by light beams, which in their entirety can transport the complete image content. The position of the eye pupil plane is dependent on the position of the eye pupil. Thus, the eye pupil plane is located in particular between the redirection unit and an exit pupil plane. The exit pupil plane is in particular designed as a plane of the optical system, preferably of the smart glasses, that is substantially parallel to the eye pupil plane and in which the pupil of the user of the optical system is approximately ideally located when the optical system is used by the user. In this plane, the bundle of light beams is optimally focused. If the eye pupil plane is at the location of the exit pupil plane, the exit pupils on the exit pupil plane are also eye boxes. The exit pupils as eye boxes represent the optimally focused bundles of light beams. Alternatively, the eye pupil plane can also be located behind the exit pupil plane relative to the redirection unit. An optical replication component is to be understood in particular as a component of the optical system that comprises optical elements and generates a spatially offset optical replication of projected image content. In particular, the optical replication component forms at least a part of the redirection unit. In particular, the optical replication component is provided to replicate all image content projected via the individual imaging paths of the optical segmentation element. In particular, the optical replication component is provided to generate a number of eye boxes corresponding to a multiple (e.g., double, triple, etc.) of a number of segmentations carried out by the optical segmentation element.

According to an example embodiment of the present invention, in the method for projecting image content onto the retina of a user with the aid of the optical system described above, the image data are first captured by means of the image processing device. Subsequently, at least one first subset of the image data is blanked and thus a second active subset of image data is generated. Here, the first and second subsets make up the total amount of the image data. The blanking of the image data means in particular deactivation of a subset of the image data. In particular, the blanking of the image data means masking of a subset of the image data. Here, pixels as image data are in particular deactivated or darkened. In particular, the subsets contain amounts in a range between 0 and 100% of the total amount of the image data. Subsequently, the projector unit is controlled by means of the in particular blanked and active subsets of the image data such that there is always only one eye box, generated on a common imaging path, with the same active image data arranged in the region of a first pupil region of the user. Here, the first pupil region surrounds the pupil center. At least a portion of the eye box is arranged with at least a portion of the active image data within a second pupil region of the user. Here, the second pupil region surrounds the pupil center. The second pupil region is arranged within the first pupil region. This results in the advantage that no double images appear for the user within the two pupil regions, independently of the distance between the eye pupil and the redirection unit. Such double images result from simultaneous display of the same image data in eye boxes of a common imaging path within the first pupil region. At the same time, however, it is also ensured that at least a portion of the image data is always arranged within the smaller, second pupil region.

According to an example embodiment of the present invention, preferably, in a further method step, at least one third subset of the image data is blanked and thus an active fourth subset of the image data is generated. Here, the third and fourth subsets make up the total amount of the image data. The second subset and the fourth subset differ at least partially from one another. In particular, the difference between the subsets does not mean the number of image data within the subsets. Rather, the individual image data have positions, in particular pixel positions, in particular assigned by the image content, on the image plane. The subsets differ in particular in these positions of the image data. Here too, the subsets contain amounts in a range between 0 and 100% of the total amount of the image data. In particular, for this further method step, in particular in a first substep, at least one, in particular complete, copy of the image data is generated by means of the image processing device, so that at least two complete instances of the image data are present. In a second substep, the partial blanking takes place in the at least two complete instances of the image data, so that the blanked first subset of the image data is produced in the first instance of the image data and the blanked third subset of the image data is produced in the second instance of the image data. Accordingly, the active second subset of the image data is produced in the first instance of the image data, and the active fourth subset of the image data is produced in the second instance of the image data. Alternatively, the two substeps can also be combined. Alternatively, both substeps can also be carried out without further intermediate storage of the image data, for example by logical operations during the electronic, preferably digital transmission of the image data within the image processing device, for example in a pipeline structure or multiple parallel pipeline structures.

According to an example embodiment of the present invention, the image data preferably enable a projection of the image content via at least four different imaging paths by means of the optical segmentation element onto at least one projection region of the redirection unit. In particular, the different subsets of the image data enable a projection of in each case at least a portion of the image content via the at least four different imaging paths by means of the optical segmentation element onto at least one projection region of the redirection unit. This projection via the different imaging paths can take place simultaneously or alternatively sequentially. The at least four different imaging paths thus also enable four different eye boxes, which can be multiplied as desired by means of the optical replication component. Preferably, in a further method step, at least one fifth subset of the image data is blanked and thus an active sixth subset of image data is generated for this purpose. Here, the fifth and sixth subsets make up the total amount of the image data. Furthermore, at least one seventh subset of the image data is blanked and thus an active eighth subset of image data is generated. The seventh and eighth subsets here make up the total amount of the image data. The second, fourth, sixth and eighth subsets differ at least partially from one another. In particular, two further, in particular complete, copies of the image data are generated by means of the image processing device for these further method steps. In order to generate the fifth to eighth subsets of the image data, a procedure in two substeps is possible, in which at least two further complete copies of the image data are generated in a first substep, for example in an image memory, so that a total of four instances of the image data are present. In a second substep, the partial blanking takes place in the instances of the image data, so that the blanked first, third, fifth and seventh subsets of the image data are produced in the first, second, third and fourth instances of the image data. Accordingly, the active second, fourth, sixth and eighth subsets of the image data are produced in the first, second, third and fourth instances of the image data. Alternatively, the two substeps can also be combined. Alternatively, both substeps can also be carried out without further intermediate storage of the image data, for example by logical operations during the electronic, preferably digital transmission of the image data within the image processing device, for example in a pipeline structure or multiple parallel pipeline structures.

According to an example embodiment of the present invention, preferably, all active subsets of the image data together make up at least the complete image content. This ensures that the complete image content is displayed to the user. Preferably, all active subsets of the image data together make up more than the complete image content. As a result, the method can be made more robust overall to the effect that the visibility of the complete image content is ensured even with imprecise knowledge of the pupil position. The active subsets of the image data preferably partially overlap, whereby portions of the image content are displayed to the user multiple times in different eye boxes. Preferably, a brightness of the active subsets of the image data is adjusted in an overlap region of the active subsets of the image data such that a distribution of the brightness of the projected image content is substantially uniform. In particular, for this purpose the brightness of all active subsets of the image data, in particular pixels, is dimmed in the overlap region with an equal first dimming factor. Alternatively, in particular only one of the active subsets of image data is dimmed in the overlap region with a second dimming factor. In particular, the dimming factor is generated by means of a brightness gradient. In particular, the brightness gradient is designed such that within the overlap region the brightness of the active subsets of the image data decreases as the distance from the blanked subsets of the image data decreases. In particular, the information whether a pixel belongs to the active or blanked subset of the image data together with pixel-by-pixel information of the dimming factor in the overlap region can be displayed in a common brightness mask, in particular in an alpha channel added to the red, green and blue channels of the image information.

According to an example embodiment of the present invention, preferably, the first pupil region has the largest assumed pupil diameter of the user. The largest assumed pupil diameter here represents in particular the largest possible user pupil diameter, which is set by adaptation of the eye at the lower end of an ambient brightness range on which the intended use is based.

The second pupil region preferably has the smallest assumed pupil diameter of the user. The smallest assumed pupil diameter here represents in particular the smallest possible user pupil diameter, which is set by adaptation of the eye at the upper end of an ambient brightness range on which the intended use is based.

According to an example embodiment of the present invention, preferably, the at least one blanked subset of the image data is selected, in particular by means of the image processing device, such that the at least one generated active subset of the image data comprises at least the image data with image content situated closest to the pupil center in the plurality of mutually spatially offset eye boxes, in particular on an eye pupil plane. In other words, the at least one generated active subset of the image data comprises at least the image data with image content at the shortest distance from the pupil center in the plurality of mutually spatially offset eye boxes, in particular on an eye pupil plane. This ensures that the generated active subsets of the image data are located within the first pupil region and also substantially within the second pupil region.

According to an example embodiment of the present invention, preferably, at least two of the blanked subsets are of substantially the same size, depending on the pupil position, in particular the position of the pupil center of the user relative to the generated eye boxes. This means that there is at least one pupil position in which at least two of the blanked subsets are of substantially the same size. In this context, it is preferably provided in connection with the at least four different imaging paths for the second, fourth, sixth and eighth subsets each to correspond to a quarter of the total amount of the image data, depending on the pupil position. In other words, the image content is divided into four equally sized quarters in the image plane. If there are two different imaging paths, the active subsets of the image data each correspond to one half of the total amount of the image data. This constellation of equally sized subsets occurs in particular when at least one equally sized portion of each eye box generated on a different imaging path is located within the second pupil region. Alternatively, the blanked subsets of the image data are preferably of different sizes. This constellation occurs in particular when differently sized portions of each eye box generated on a different imaging path are located within the second pupil region.

According to an example embodiment of the present invention, preferably, the plurality of eye boxes are generated by means of the optical segmentation element and the optical replication component such that the eye boxes are arranged substantially in a grid. A "grid" is to be understood in particular as a regular pattern distributed on an area. In particular, the eye boxes are arranged without overlapping one another. In particular, different geometric arrangement patterns are possible for an arrangement of the eye boxes within the eye pupil plane of the optical system (eye box pattern). Preferably, the eye boxes are arranged substantially in a rectangle shape. In particular, the eye boxes are arranged substantially in a square shape in this connection. In particular, the eye boxes are alternatively arranged substantially in a parallelogram shape. In particular, the eye boxes are arranged substantially in a diamond or rhombus shape in this connection. In particular, the eye boxes are arranged substantially in a diamond shape, wherein two internal angles have an angle size of substantially 60°.

According to an example embodiment of the present invention, in a further method step, the image data are preferably predistorted by means of the image processing device such that a distortion of the image content via the at least two imaging paths is at least partially compensated for. As a result, a particularly large effective overall eye box can advantageously be achieved, which at the same time in particular has the largest possible field of view, which is additionally advantageously free from double images. Preferably, the predistortion and the blanking of the image data are carried out simultaneously. Alternatively, the predistortion and the blanking of the image data are carried out in particular in succession. In this connection, the blanking of the image data is carried out in particular before the predistortion of the image data. In particular, the image processing device is further designed to rotate, move, scale or similar the image data of the image source. In particular, the image processing device is designed to assign a position correction to each individual pixel of the image data according to a mathematical rule, for example a look-up table or an equation, in particular a polynomial, in particular a position correction that is individual to the red, green and blue channels and in particular can take into account calibration data.

According to an example embodiment of the present invention, preferably, the pupil position of the user relative to the generated eye boxes is additionally detected by means of an eye tracker. In particular, the position of the pupil center relative to the generated eye boxes is detected by means of the eye tracker. Thus, a changed pupil position of the user and a thus necessary change in the blanked and active subsets of the image data can be taken into account automatically in the method.

Further subject matter of the present invention is an image processing device designed to carry out the above-described method for projecting image content onto the retina of a user. In this connection, according to an example embodiment of the present invention, the image processing device is designed to capture image data and to blank at least one first subset of the image data. Thus, an active second subset of image data is generated, wherein the first and second subsets make up the total amount of the image data. In addition, the image processing device is designed to control a projector unit by means of the in particular blanked and active subsets of the image data such that there is always only one eye box, generated on a common imaging path, with the same active image data arranged in the region of a first pupil region of the user. Here, the first pupil region surrounds the pupil center. In addition, at least a portion of the eye box is arranged with at least a portion of the active image data within a second pupil region of the user. Here, the second pupil region surrounds the pupil center. The second pupil region is arranged within the first pupil region.

Further subject matter of the present invention is an optical system for a virtual retinal scan display that has the above-described image source that supplies image content in the form of image data. In addition, the optical system has the above-described image processing device that is designed to carry out the likewise above-described method for projecting image content onto the retina of a user. Moreover, the optical system has the above-described projector unit with a temporally modulatable light source for generating at least one light beam and with a controllable deflection device for the at least one light beam for scanning projection of the image content. In addition, the optical system comprises the above-described redirection unit onto which the image content can be projected and which is designed to direct the projected image content onto an eye of a user. Moreover, the optical system has the above-described optical segmentation element that is arranged between the projector unit and the redirection unit and is designed to project the image content via at least two different imaging paths onto at least one projection region of the redirection unit, wherein at least some imaging paths are individually controllable. In addition, the optical system has the likewise above-described optical replication component that is arranged in the at least one projection region of the redirection unit and is designed to direct the projected image content in a replicated and spatially offset manner onto the eye of the user, so that a plurality of mutually spatially offset eye boxes with the image content is generated.

According to an example embodiment of the present invention, preferably, the optical system comprises smart glasses with spectacle frames and spectacle lenses. In this case, the at least one projector unit and the at least one optical segmentation element are arranged on the spectacle frame. The at least one redirection unit is arranged with the at least one optical replication component in the region of at least one of the spectacle lenses. In particular, the redirection unit with the at least one optical replication component is integrated into the at least one spectacle lens.

DETAILED DESCRIPTION OF EXAMPLE EMBODIMENTS

Figures 1, 2:
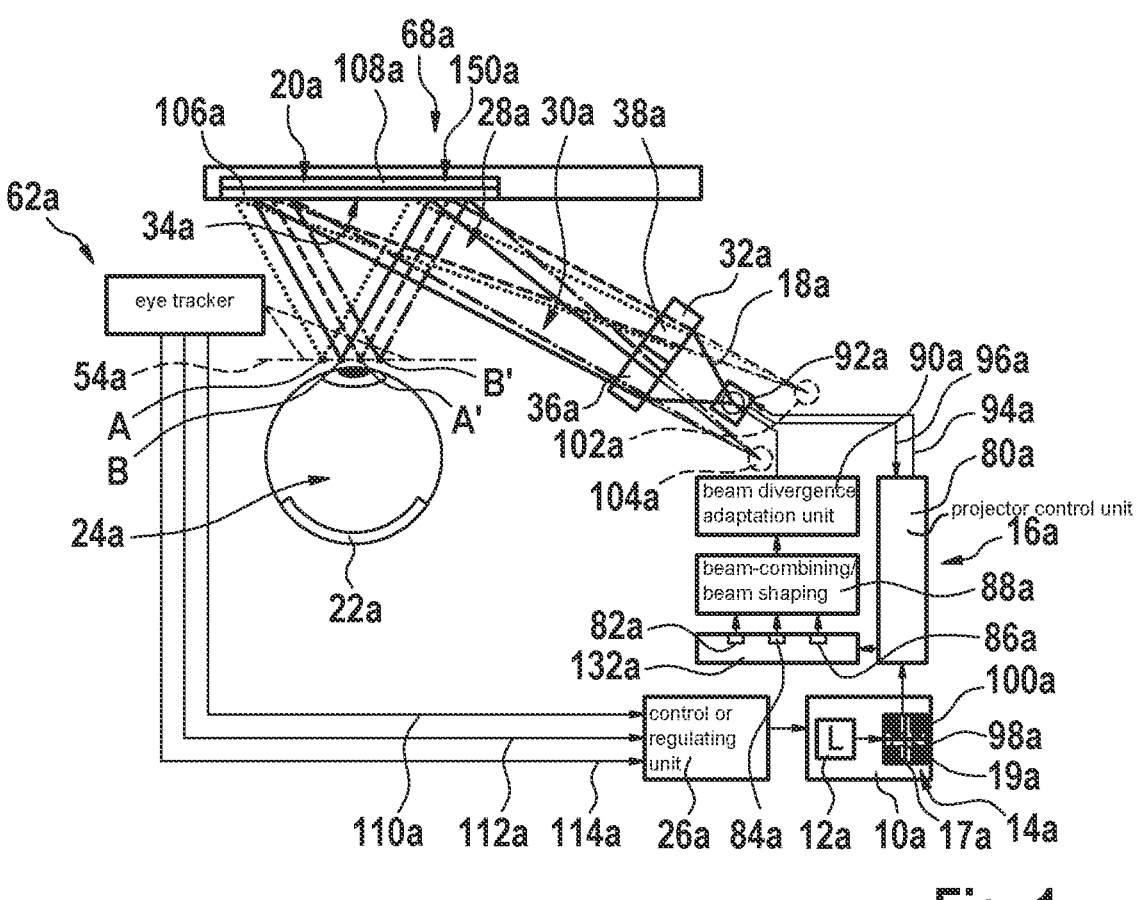
FIG. 1 shows an optical system for a virtual retinal scan display, according to an example embodiment of the present invention.
FIG. 2 shows the optical system, comprising smart glasses, according to an example embodiment of the present invention.

FIG. 1 shows a schematic representation of the optical system 68a. The optical system 68a has an image source (not shown here). The image source supplies image content in the form of image data 12a. The image source is in particular an integral part of the smart glasses 66a, which are shown in FIG. 2. Alternatively, the image source can also be designed as the external device 146a or as part of the external device 146a. The optical system 68a has an image processing device 10a. The image data 12a can form a still image or a video feed, for example. In addition, the optical system 68a has an image processing device 10a, which is designed to capture the image data 12a and to blank at least one first subset 17a of the image data, thereby generating an active second subset 19a of image data 14a. The first and second subsets make up the total amount of the image data. In addition, the image processing device is designed to control a projector unit 16a of the optical system 68a by means of the in particular blanked and active subsets of the image data such that there is always only one eye box A, A' or B, B', generated on a common imaging path 28a or 30a, with the same active subsets 19a of the image data 14a arranged in the region of a first pupil region (not shown here) of the user. In this case, the first pupil region surrounds the pupil center (not shown here), and at least a portion of the eye box A, A', B, B' is arranged with at least a portion of the active image data within a second pupil region (not shown here) of the user. Here, the second pupil region surrounds the pupil center, and the second pupil region is arranged within the first pupil region. The image processing device 10a can be partially formed integrally with the computing unit 78a. In the exemplary embodiment shown in FIG. 1, the image processing device 10a generates four copies 14a of the image data, each of which comprises the complete image content. Then, the copied image data are blanked by the image processing device in portions. In this case, the image processing device 10a is designed to generate a matrix-like arrangement of the copied and blanked subsets of the image data and to output it to the projector unit 16a of the optical system 68a.

The optical system 68a has the projector unit 16a. The projector unit 16a receives the copied image data 14a from the image processing device 10a. The projector unit 16a is designed as a laser projector unit. The projector unit 16a is designed to emit the image data 14a in the form of light beams 18a. The light beams 18a are in the form of scanned laser beams. The scanned laser beams generate reproductions of all images 98a, 100a of the copied image data 14a on each pass through a scan region of the projector unit 16a. The projector unit 16a comprises a projector control unit 80a. The projector unit 16a comprises a temporally modulatable light source 132a. The temporally modulatable light source 132a is designed to generate the light beams 18a. The projector control unit 80a is provided to control or regulate the generation and/or modulation of the light beams 18a through the light source 132a. In the exemplary embodiment shown, the light source 132a comprises three (amplitude-modulatable) laser diodes 82a, 84a, 86a. A first laser diode 82a generates a red laser beam. A second laser diode 84a generates a green laser beam. A third laser diode 86a generates a blue laser beam. The projector unit 16a has a beam-combining and/or beam-shaping unit 88a. The beam-combining and/or beam-shaping unit 88a is designed to combine, in particular mix, the differently colored laser beams of the laser diodes 82a, 84a, 86a to generate a color image. The beam-combining and/or beam-shaping unit 88a is designed to shape the light beam 18a, in particular the laser beam, exiting the projector unit 16a. Details on the formation of the beam-combining and/or beam-shaping unit 88a are described in the related art. The projector unit 16a comprises a beam divergence adaptation unit 90a. The beam divergence adaptation unit 90a is provided to adapt a beam divergence of the light beam 18a, in particular laser beam, exiting the projector unit 16a, preferably to a path length of the relevant currently emitted light beam 18a, which path length is dependent in particular on an arrangement of optical elements of the optical system 68a. The beam divergence of the light beams 18a, in particular laser beams, exiting the projector unit 16a is preferably adapted such that, after passing through the optical elements of the optical system 68a, a sufficiently small and sharp laser spot is produced at the location at which the beam is incident on a retina 22a of a user's eye 24a of the virtual retinal scan display, and the beam divergence at the location of an eye pupil plane 54a of the optical system 68a in front of the user's eye 24a is at least substantially constant over the entire reproduction of the image data 12a generated by the light beam 18a, in particular the laser beam. Details on the formation of the beam divergence adaptation unit 90a, for example by means of lenses with a fixed and/or variable focal length, are described in the related art. The projector unit 16a comprises at least one controllable deflection device 92a. The controllable deflection device 92a is designed as a MEMS mirror. The MEMS mirror is part of a micromirror actuator (not shown). The controllable deflection device 92a is designed for controlled deflection of the laser beam to generate a raster image. Details on the formation of the micromirror actuator are described in related art. The projector control unit 80a is designed to control or regulate a movement of the controllable deflection device 92a (see arrow 94a). The controllable deflection device 92a regularly sends its current position signals back to the projector control unit 80a (see arrow 96a).

The optical system 68a has a redirection unit 20a. The image content can be projected onto the redirection unit 20a. The redirection unit 20a is designed to direct the projected image content onto the user's eye 24a. The redirection unit 20a forms a projection region 34a. Light beams 18a incident on the redirection unit 20a within the projection region 34a are at least partially redirected/projected in the direction of the user's eye 24a. The redirection unit 20a is designed to influence (refract, scatter and/or reflect) the light beams 18a such that at least a portion of the light beams 18a, preferably at least one image 98a, 100a generated from the image data 12a, is reproduced on the eye pupil plane 54a of the optical system 68a, in particular on the retina 22a of the user's eye 24a. The optical system 68a is designed to form a plurality of eye boxes A, A', B, B' by means of different optical elements. The optical system 68a is designed to influence the light beams 18a by means of the different optical elements such that the generated eye boxes A, A', B, B' are generated spaced apart from one another. The optical system 68a forms the eye pupil plane 54a. The eye boxes A, A', B, B' are all located next to one another and/or one above the other in the eye pupil plane 54a. In the case shown, the eye pupil plane 54a is arranged at the location of an exit pupil plane, which is designed as an area provided for the optimal placement of the user's eye 24a (within the smart glasses 66a), in particular provided for the placement of entrance pupils of the user's eye 24a (within the smart glasses 66a), in space. The eye pupil plane 54a is preferably flat, but deviates from a perfect plane by small curvatures. The eye pupil plane 54a can be approximately regarded/referred to as an eye pupil plane. The eye pupil plane 54a lies in front of the spectacle lenses 70a, 72a of the smart glasses 66a in a viewing direction of the user and runs at least substantially in parallel with a lens plane of the spectacle lenses 70a, 72a. In this case, the term "substantially parallel" is to be understood in particular to mean that deviations of up to 20° from a perfect plane are also included therein (keyword: facial wrap and pantograph tilt of the spectacle lenses 70a, 72a).

The optical system 68a shown by way of example in FIG. 1 is designed to generate a spatial image segmentation of the copied and blanked image data 14a. In the spatial image segmentation, the image data 14a are divided into in each case spatially separate (optionally modified) reproductions of the image content/image data 12a. Each segment then comprises exactly one (in this case partial) reproduction of the image content/image data 12a. The optical system 68a comprises at least one optical segmentation element 32a for generating the spatial segmentation of the copied and blanked subsets of the image data 14a. The optical segmentation element 32a is arranged between the projector unit 16a, in particular the deflection device 92a of the projector unit 16a, and the redirection unit 20a. With the aid of the optical segmentation element 32a, the image content can be projected onto the at least one projection region 34a of the redirection unit 20a via different imaging paths 28a, 30a. In the exemplary embodiment of FIG. 1, the optical segmentation element 32a is designed as a segmented lens, in particular as a segmenting lens. Alternatively, the optical segmentation element 32a can also be designed as a segmenting mirror (not shown), as a segmenting optical grid (not shown), as a volume hologram (not shown) or as a beam splitter (not shown). The optical segmentation element 32a comprises multiple individual segments 36a, 38a, in particular individual lenses. One of the images 98a, 100a is projected through each of the individual segments 36a, 38a. This results in a dedicated virtual deflection device (virtual MEMS mirror) 102*a*, 104*a* arranged separately from further virtual deflection devices (virtual MEMS mirrors) 102*a*, 104*a* and from the real deflection device 92*a* for each image 98*a*, 100*a*. In particular, the virtual deflection devices (virtual MEMS mirrors) 102*a*, 104*a* can (theoretically) be designed as point sources. In general, however, the virtual deflection devices (virtual MEMS mirrors) 102*a*, 104*a* do not form point sources, but astigmatic sources. Each image 98*a*, 100*a* is thereby radiated onto the projection region 34*a* of the redirection unit 20*a* via a different imaging path 28*a*, 30*a*, in particular from a different angle and from a different distance.

The optical system 68*a* shown by way of example in FIG. 1 is designed to generate image replication purely by optical elements of the optical system 68*a*. The optical system 68*a* has an optical replication component 150*a*. The optical replication component 150*a* is arranged in the projection region 34*a* of the redirection unit 20*a*. The optical replication component 150*a* is designed to direct the projected image content in a replicated and spatially offset manner onto the user's eye 24*a*, so that a plurality of mutually spatially offset eye boxes A, A', B, B' with the image content is generated. The optical replication component 150*a* is at least partially reflective and at least partially transparent to generate the image replication. The optical replication component 150*a* comprises partially reflective and partially transparent layers 106*a*, 108*a*. The layers 106*a*, 108*a* of the optical replication component 150*a* have different optical functions, in particular different deflection angles. The layers 106*a*, 108*a* of the optical replication component 150*a* are designed as deflective and/or focusing holographic optical elements (HOEs). A total of the eye boxes A, A', B, B' is generated by combinations of the image segmentation by the optical segmentation element 32*a* and the image replication of the optical replication component 150*a*. The optical replication component 150*a* is integrated into one of the spectacle lenses 72*a* of the smart glasses 66*a*. The optical replication component 150*a* is arranged in a field of view of the smart glasses 66*a*.

In the exemplary embodiment shown in FIG. 1, the optical replication component 150*a* is realized in a layer structure with two holographically functionalized layers 106*a*, 108*a*. The optical replication component 150*a* comprises two laterally completely overlapping holographically functionalized layers 106*a*, 108*a*, which are arranged in layers one behind the other. The layers 106*a*, 108*a* are planar and continuous. The optical replication component 150*a* is realized in a layer structure with the at least two layers 106*a*, 108*a* arranged one above the other with different holographic functions, as a result of which the plurality of mutually spatially offset eye boxes A, A', B, B' is generated. A portion of each light beam 18*a* is deflected at the first layer 106*a*, while the rest of the light beam 18*a* passes through the first layer 106*a*. Another portion of the fraction of the light beam 18*a* passing through the first layer 106*a* is deflected at the second layer 108*a*, while the rest of the light beam 18*a* passes through the second layer 108*a* and the spectacle lens 72*a* into which the optical replication component 150*a* is integrated.

The optical system 68*a* has an eye tracker 62*a*. The eye tracker 62*a* is integrated in one of the earpieces 74*a*, 76*a* (see FIG. 2). Alternative arrangements of the eye tracker 62*a* are possible. The eye tracker 62*a* is designed to ascertain the pupil position, in particular the position of the pupil center, of the user relative to the generated eye boxes A, A', B, B'.

The image processing device 10*a* is designed to adapt the at least one first blanked subset 17*a* of the image data 14*a* depending on the pupil position detected by means of the eye tracker 62*a*, so that there is always only one eye box A, A' or B, B', generated on a common imaging path 28*a* or 30*a*, with the same active image data 19*a* arranged in the region of a first pupil region of the user, and at least a portion of the eye box A, A', B, B' is arranged with at least a portion of the active image data 19*a* within the second pupil region of the user.

The optical system 68*a* has the electronic control or regulating unit 26*a*. The control or regulating unit 26*a* can be partially formed integrally with the computing unit 78*a*. The control or regulating unit 26*a* shown by way of example in FIG. 1 is provided for controlling the image processing device 10*a*. The control or regulating unit 26*a* is designed to control the image processing device 10*a* on the basis of measurement data from the eye tracker 62*a*. The control or regulating unit 26*a* receives measurement data relating to a pupil position from the eye tracker 62*a* (see arrow 110*a*). On the basis of the data of the eye tracker 62*a*, the control or regulating unit 26*a* generates control or regulating commands for controlling the image processing device 10*a*. For example, these commands can be provided to increase or decrease the blanked subsets 17*a* of the image data 14*a*.

FIG. 2 shows a schematic representation of the optical system 68*a* with smart glasses 66*a*. The smart glasses 66*a* have spectacle lenses 70*a*, 72*a*. The spectacle lenses 70*a*, 72*a* are predominantly transparent. The smart glasses 66*a* have a spectacle frame 144*a* with earpieces 74*a*, 76*a*. The smart glasses 66*a* form a part of the optical system 68*a*. In the case shown in FIG. 2, the optical system 68*a* comprises an external device 146*a*. The external device 146*a* is designed by way of example as a smartphone. The external device 146*a* has a data communication connection 148*a* to the smart glasses 66*a*. Alternatively, the smart glasses 66*a* can also completely form the optical system 68*a*. The optical system 68*a* is provided to form a virtual retinal scan display. In the example shown in FIG. 2, the smart glasses 66*a* have a computing unit 78*a*. The computing unit 78*a* is integrated into one of the earpieces 74*a*, 76*a*. Alternative arrangements of the computing unit 78*a* in the smart glasses 66*a*, for example in a spectacle lens edge, are also possible. A "computing unit 78*a*" is to be understood in particular as a controller with a processor, a memory unit, and/or a operating, control and/or calculation program stored in the memory unit. The computing unit 78*a* is provided to operate the smart glasses 66*a*, in particular individual components of the smart glasses 66*a*.

Whereas in the illustration of FIG. 2 the projector unit 16*a* and the optical segmentation element 32*a* are arranged by way of example on the spectacle frame 144*a*, and the redirection unit 20*a* is arranged with the replication component 150*a* in the region of a spectacle lens 72*a*, in particular integrated into at least the spectacle lens 72*a*, it is alternatively also possible for at least the image source together with the image processing device 10*a* to be arranged in the external device 146*a* and for the image data 14*a* to be transmitted from the external device 146*a* to the projector unit 16*a* of the smart glasses 66*a*.

Figure 3:
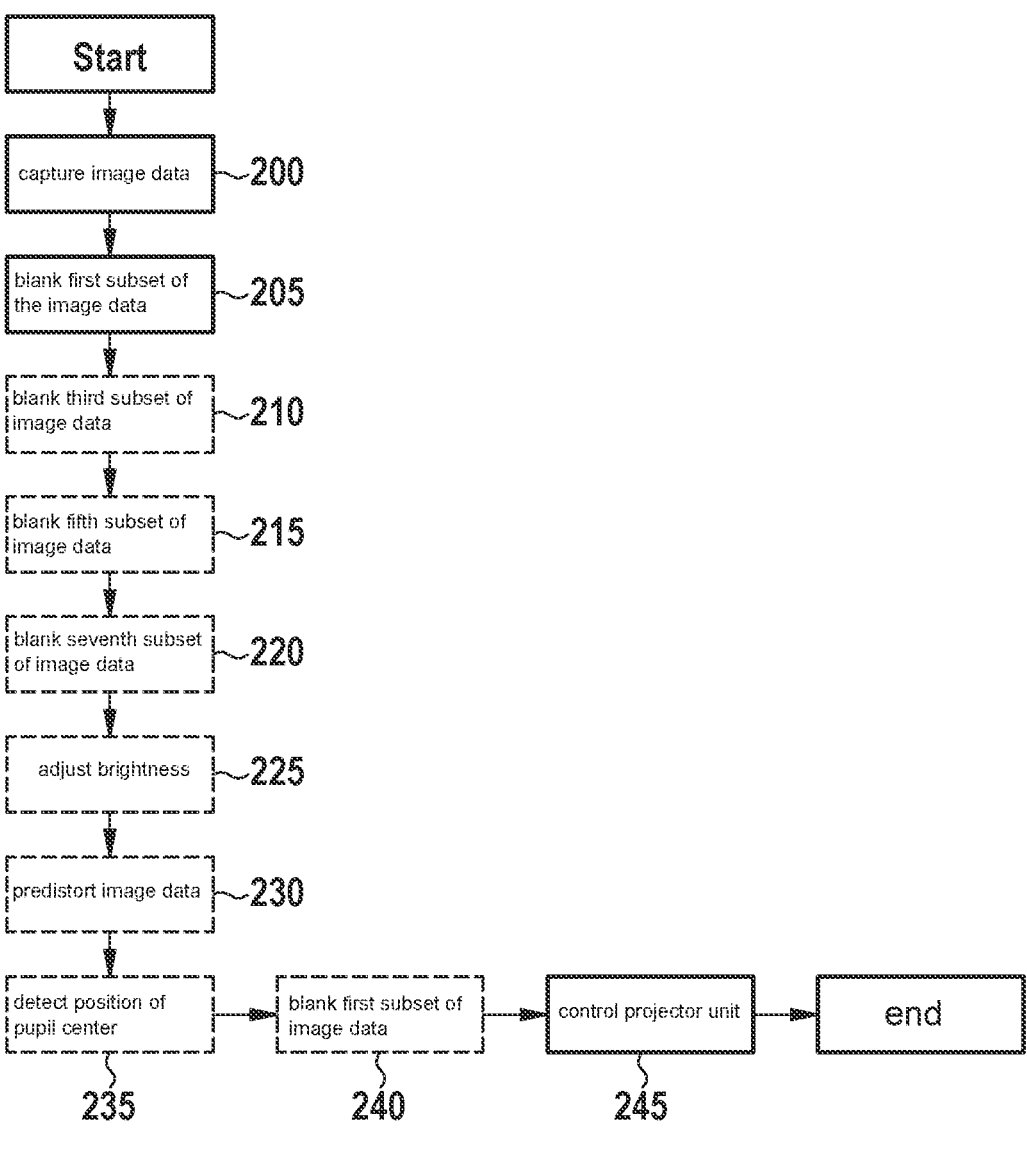
FIG. 3 shows a method for projecting image content onto the retina of a user with the aid of an optical system, according to an example embodiment of the present invention.

FIG. 3 shows, in the form of a flow chart, a method for projecting image content onto the retina of a user with the aid of an optical system. The optical system is in particular designed according to the above-described FIG. 1. In the method, image data are captured by means of the image processing device in a method step 200. In a subsequent method step 205, at least one first subset of the image data is blanked, thereby generating an active second subset of image data. Here, the first and second subsets make up the total amount of the image data. In a subsequent method step 245, the projector unit is controlled by means of the in particular blanked and active subsets of the image data such that there is always only one eye box, generated on a common imaging path, with the same active image data arranged in the region of a first pupil region of the user. Here, the first pupil region surrounds the pupil center. In particular, the first pupil region has the largest assumed pupil diameter of the user. At least a portion of the eye box is arranged with at least a portion of the active image data within a second pupil region of the user. Here, the second pupil region surrounds the pupil center. In particular, the second pupil region has the smallest assumed pupil diameter of the user. The second pupil region is arranged within the first pupil region. The method is then terminated.

In an optional method step 210 following method step 205, at least one third subset of the image data is blanked and thus an active fourth subset of image data is generated. Here, the third and fourth subsets make up the total amount of the image data. The second subset and the fourth subset differ at least partially from one another.

Furthermore, the image data, in particular the different subsets of the image data, optionally enable a projection in particular of in each case at least a portion of the image content via at least four different imaging paths by means of the optical segmentation element onto at least one projection region of the redirection unit. In an optional method step 215 following method step 210, at least one fifth subset of the image data is blanked and thus an active sixth subset of image data is generated. The fifth and sixth subsets make up the total amount of the image data. Furthermore, in this context, in a subsequent method step 220, at least one seventh subset of the image data is blanked and thus an active eighth subset of image data is generated. The seventh and eighth subsets make up the total amount of the image data. The second, fourth, sixth and eighth subsets differ at least partially from one another. Optionally, the second, fourth, sixth and eighth subsets each correspond to a quarter of the total amount of the in particular original image data.

Further optionally, all active subsets of the image data make up at least the complete image content. Furthermore, the subsets of the active image data optionally at least partially overlap. In this connection, in an optional method step 225 following method step 220, a brightness of the active image data is adjusted in an overlap region of the active subsets of the image data such that a distribution of the brightness of the projected image content is substantially uniform.

Further optionally, the at least one blanked subset of the image data is selected such that the at least one active subset of the generated image data comprises at least the image data with image content situated closest to the pupil center in the plurality of mutually spatially offset eye boxes, in particular on an eye pupil plane.

Further optionally, the blanked subsets of the image data are substantially the same size. Alternatively, the blanked subsets of the image data are of different sizes.

Optionally, the plurality of eye boxes are generated by means of the optical segmentation element and the optical replication component such that the eye boxes are arranged substantially in a grid. The eye boxes, in particular four eye boxes in each case, are arranged substantially in a rectangle shape, in particular in a square shape. Alternatively, the eye boxes, in particular four eye boxes in each case, are arranged substantially in a parallelogram shape, in particular in a diamond shape. In particular, the eye boxes are arranged substantially in a diamond shape, wherein two internal angles have an angle size of substantially 60°.

In a further optional method step 230 following method step 225, the image data are predistorted by means of the image processing device such that a distortion of the image content via the at least two imaging paths is at least partially compensated for. In particular, the predistortion and the blanking of the image data are carried out simultaneously. Alternatively, the predistortion and the blanking of the image data are carried out in succession.

In a further optional method step 235 following method step 230, the pupil position, in particular the position of the pupil center of the user relative to the generated eye boxes, is additionally detected by means of an eye tracker. In a subsequent optional method step 240, the blanking of at least one first subset of the image data is carried out depending on the detected pupil center.

Figure 4A:
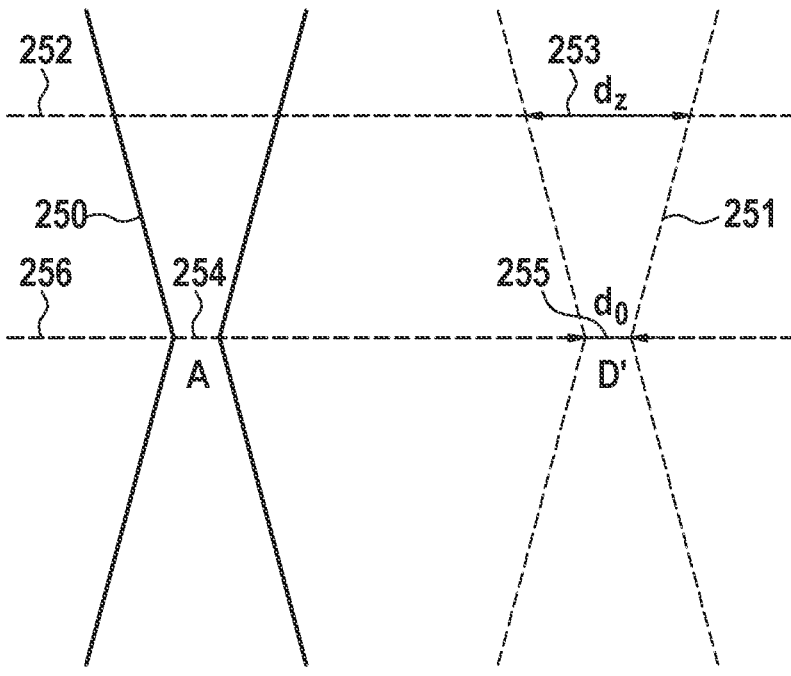
FIG. 4A shows different distances between the eye pupil and the redirection unit, according to an example embodiment of the present invention.
Figure 4B:
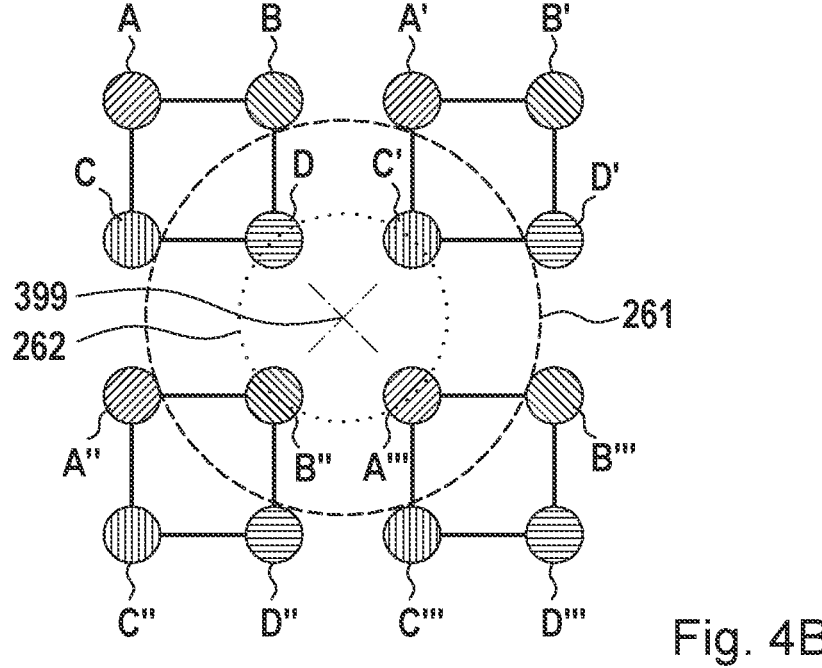
FIG. 4B shows the eye boxes in the eye pupil plane when the eye is located in the exit pupil plane of the optical system, according to an example embodiment of the present invention.

FIG. 4A schematically shows the influence of the distance of the eye pupil plane 252 and 256 from the redirection unit (not shown here) on the diameter 253 and 255 of the bundle of beams belonging to the eye box D'. The exit pupil plane as the eye pupil plane 256 here represents the optimal distance, since at this distance the light beams redirected by the redirection unit are focused in a smallest possible diameter 255 of the exit pupil as the eye box D'. The exit pupils produced therefrom as eye boxes A and D' on the exit pupil plane as the eye pupil plane 256 in the case of four different imaging paths and a 3-fold replication are shown schematically in FIG. 4B. In this embodiment, the eye boxes A, B, C, D, A', B', C', D', A'', B'', C''1, D'', A''', B''', C''' and D''' are each arranged in a rectangular grid. At this distance of the eye pupil plane 256 from the redirection unit, only one eye box A, A', A'', A''' or B, B', B'', B''' or C, C', C'', C''' or D, D', D'', D''', generated on a common imaging path, with the same active image data is arranged in the region of a first pupil region 261 of the user. Here, the first pupil region 261 surrounds the pupil center 264. Moreover, at least a portion of the eye box A''', B'', C' and D is arranged with at least a portion of the active image data within a second pupil region of the user. The second pupil region 262 surrounds the pupil center 399. The second pupil region 262 is arranged within the first pupil region 261. Here, the first pupil region 261 represents the largest assumed pupil diameter of the user. The second pupil region 262 represents the smallest assumed pupil diameter of the user. In this case, there are no double images for the user, and it is also the case that the image is displayed to the user even with the smallest possible pupil diameter.

Figure 4C:
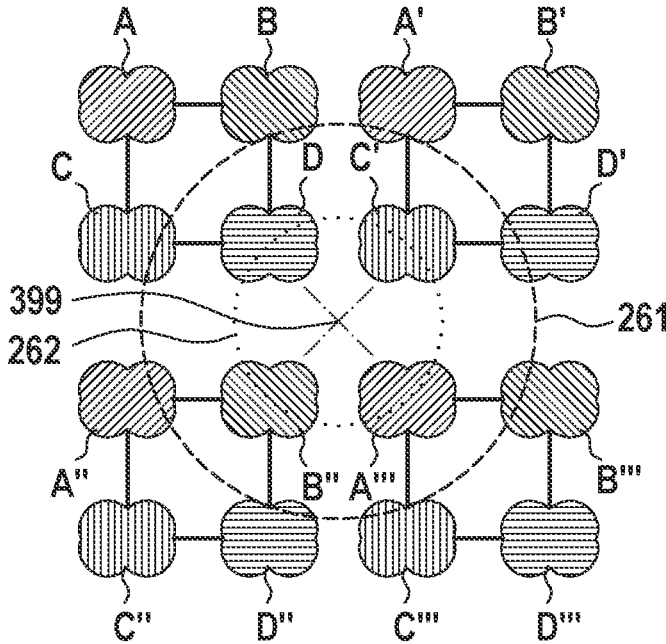
FIG. 4C shows the eye boxes in the eye pupil plane when the eye is located in front of or behind the exit pupil plane of the optical system, according to an example embodiment of the present invention.

In FIG. 4C, in contrast, the diameter of the bundles of beams in the eye pupil plane 252 is increased. In this embodiment, the eye boxes A, B, C, D, A', B', C', D', A'', B'', C'', D'', A''', B''', C''' and D''' are also each arranged in a rectangular grid. It is evident that, for this case, some of the eye boxes A'' and A''', B and B'', C and C', and D and D'' belonging to a common imaging path are located within the first pupil region 261. Thus, double images would be displayed to the user at this moment, which is not desirable.

Figure 5A:
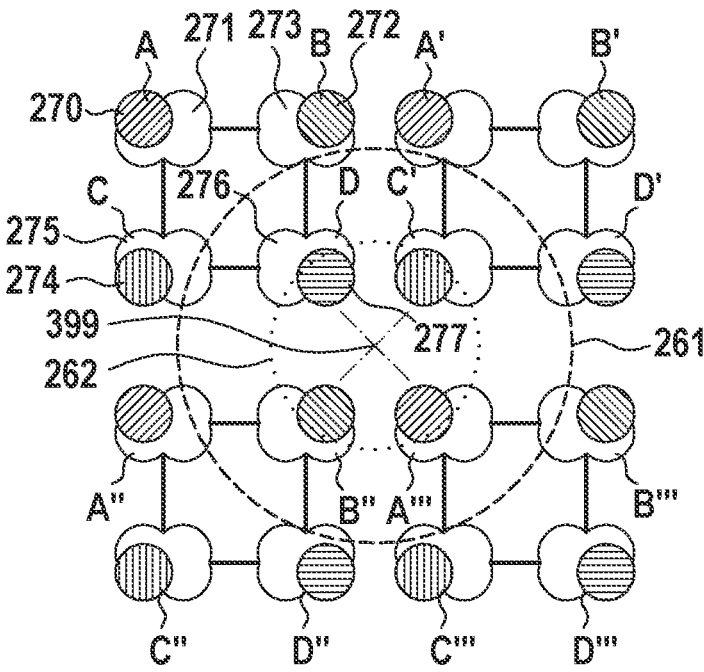
FIGS. 5A, 6A, and 7A show different positions of the pupil center and the resulting different active portions of a square arrangement of eye boxes when the eye is located in front of the exit pupil plane of the optical system, according to an example embodiment of the present invention.

FIGS. 5A to 10B show solutions to the problem by way of example. FIG. 5A shows a rectangular arrangement of the eye boxes A, B, C, D, A', B', C', D', A'', B'', C'', D'', A''', B''', C''' and D''' analogous to the arrangement of the eye boxes in FIG. 4C. The pupil center is arranged centrally in FIG. 5A, in particular in the middle, within the eye boxes A''', B'', C' and D. In contrast to the projected image data in FIG. 4C, in this case portions of the eye boxes A, B, C, D, A', B', C', D', A'', B'', C'', D'', A''', B''', C''' and D''' are now deactivated to prevent double images for the user. For this purpose, in this exemplary embodiment a first subset 281 of the image data 330 is blanked, whereby a second subset 280 of active image data is generated. The first subset 281 and second subset 280 make up the total amount of the image data 330. Moreover, a third subset 285 of the image data is blanked and thus an active fourth subset 285 of image data is generated. The third subset 285 and fourth subset 284 make up the total amount of the image data 330. In addition, a fifth subset 282 of the image data 330 is blanked and thus an active sixth subset 283 of image data is generated. The fifth subset 282 and sixth subset 283 likewise make up the total amount of the image data. In addition, a seventh subset 287 of the image data is blanked and thus an active eighth subset 286 of image data is generated. The seventh subset 287 and eighth subset 286 make up the total amount of the image data 330. The second subset 280, fourth subset 284, sixth subset 283 and eighth subset 286 differ from each other. The distinction does not mean the number of image data within the respective subsets, but the positions assigned by the image content, in particular pixel positions, of the respective image data on the image plane. In this exemplary embodiment, a total of three, in particular complete, copies of the image data 330 are generated for the generation of the different subsets. In this exemplary embodiment, the blanked subsets 281, 282, 285 and 287 of the image data are substantially the same size and correspond in each case to a quarter of the total amount of the image data 330. All active image data or the active subsets 280, 283, 284 and 285 make up the complete image content. The different subsets 280, 281, 282, 283, 284, 285, 286 and 287 of the image data 330 enable a projection of in each case a portion of the image content via four different imaging paths by means of the optical segmentation element onto at least one projection region of the redirection unit. Thus, the subsets 280 and 281 are assigned to the eye boxes A, A', A" and A''', the subsets 284 and 285 are assigned to the eye boxes B, B', B' and B''', the subsets 282 and 282 are assigned to the eye boxes C, C', C" and C''', and the subsets 286 and 286 are assigned to the eye boxes D, D', D" and D'''. The eye boxes A, A', A" and A''' accordingly have an active subregion 270 of the image data and a blanked subregion 271 of the image data. The eye boxes B, B', B" and B''' accordingly have an active subregion 272 of the image data and a blanked subregion 273 of the image data. The eye boxes C, C', C" and C''' accordingly have an active subregion 274 of the image data and a blanked subregion 275 of the image data. The eye boxes D, D', D" and D''' accordingly have an active subregion 277 of the image data and a blanked subregion 276 of the image data. By selecting the subsets 280, 281, 282, 283, 284, 285, 286 and 287, it is made possible for there to be always only one eye box A, A', A", A''' or B, B', B", B''' or C, C', C", C''' or D, D', D", D''', generated on a common imaging path, with the same active image data arranged in the region of the first pupil region 261. Double images for the user are thus prevented. In addition, the eye boxes A''', B", C' and D are arranged with the subregions 270, 272, 274 and 277 within the second pupil region 262. The blanked subsets 281, 282, 285 and 287 are selected such that the subsets 280, 283, 284 and 286 comprise the image data with image content closest to the pupil center 399 in the plurality of mutually spatially offset eye boxes A, B, C, D, A', B', C', D', A", B", C", D", A''', B''', C''' and D'''.

Figure 5B:
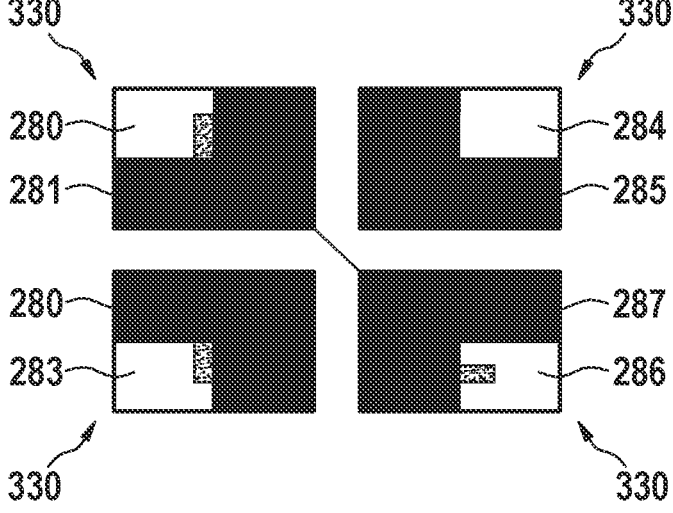
FIGS. 5B, 6B, and 7B show the associated subsets of the image data, according to an example embodiment of the present invention.
Figure 6A:
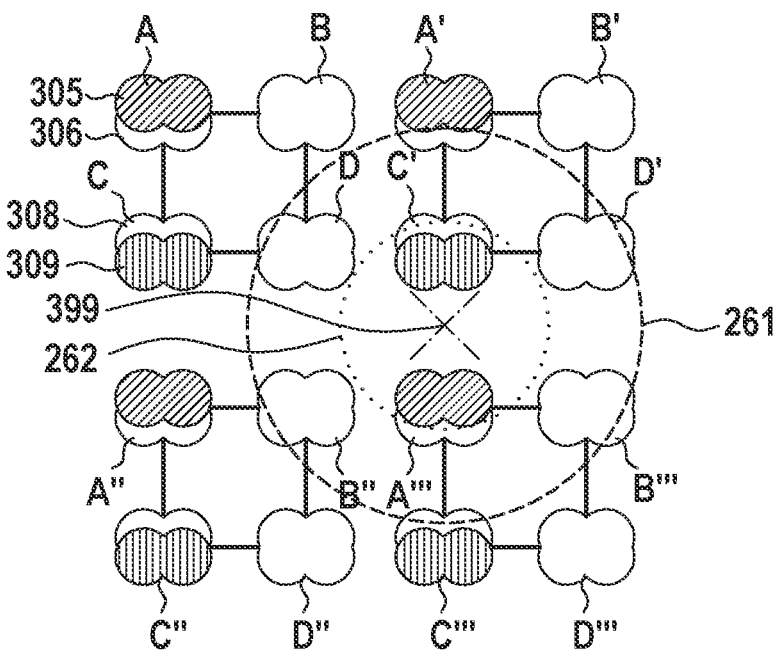
Figure 6B:
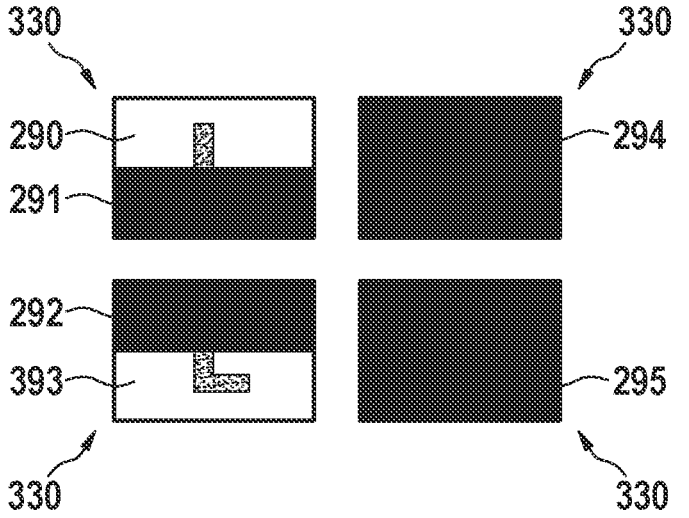

FIGS. 6A and 6B show a different position of the pupil center 399 relative to the generated eye boxes A, B, C, D, A', B', C', D', A", B", C", D", A''', B''', C''' and D''' in comparison with FIGS. 5A and 5B. In this case, a first subset 291 of the image data 330 is blanked such that a second active subset

290 of image data has an in particular upper half of the image data 330. In addition, a third, blanked subset 294 and a seventh, blanked subset 295 of the image data 330 each correspond to the total amount of the image data 330. In addition, a fifth subset 292 of the image data 330 is blanked such that an active sixth subset 291 of image data has an in particular lower half of the image data 330. Thus, only the subregions 305 and 309 of the eye boxes A, A', A" and A''', and C, C', C" and C''' have active image data. The subregions 306 and 308 of the eye boxes A, A', A" and A''', and C, C', C" and C''' are deactivated. In addition, the eye boxes B, B', B" and B''', and D, D', D" and D''' are completely deactivated.

Figure 7A:
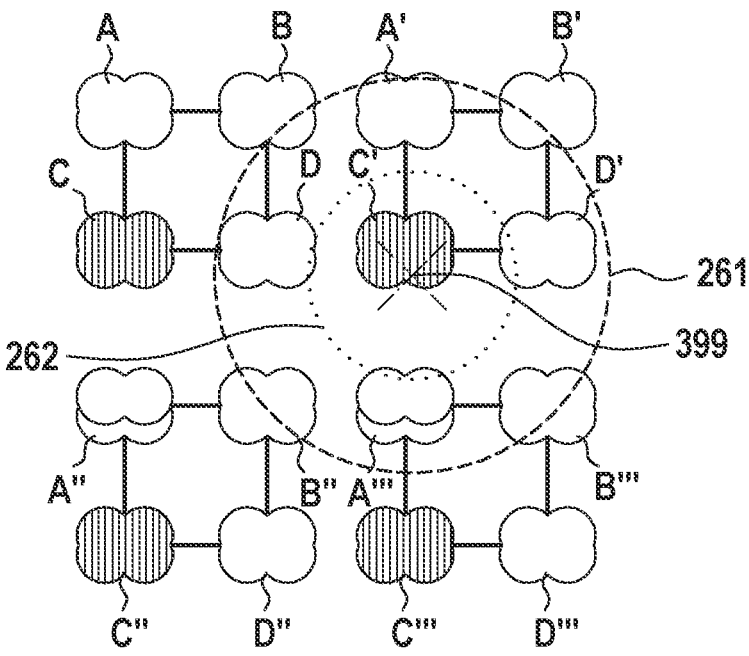
Figure 7B:
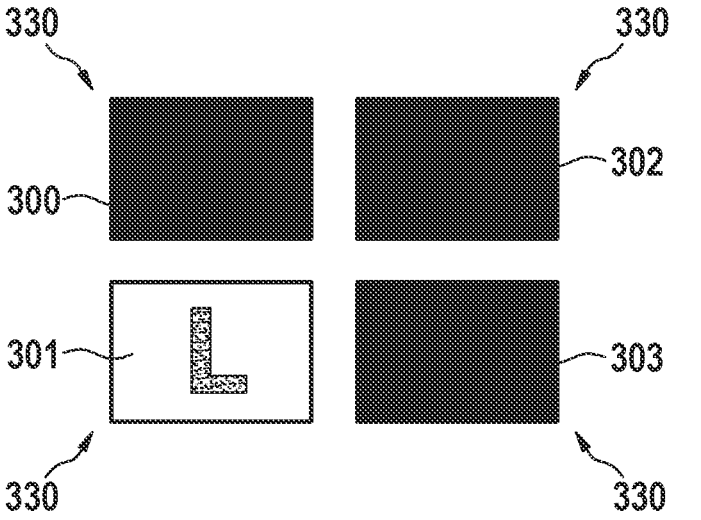

FIGS. 7A and 7B show a different position of the pupil center 399 relative to the generated eye boxes A, B, C, D, A', B', C', D', A", B", C", D", A''', B''', C''' and D''' in comparison with the previous figures. In this case, the pupil center 399 is arranged centrally, in particular in the middle, within eye box C'. In this case, the sixth subset 301 corresponds to the total amount of the image data. The first subset 300, third subset 302 and seventh subset 303 likewise correspond to the total amount of the image data. Thus, only the eye boxes C, C', C" and C''' are fully activated. In contrast, the eye boxes A, A', A", A''', B, B', B", B''', D, D', D" and D''' are completely deactivated.

Figure 8A:
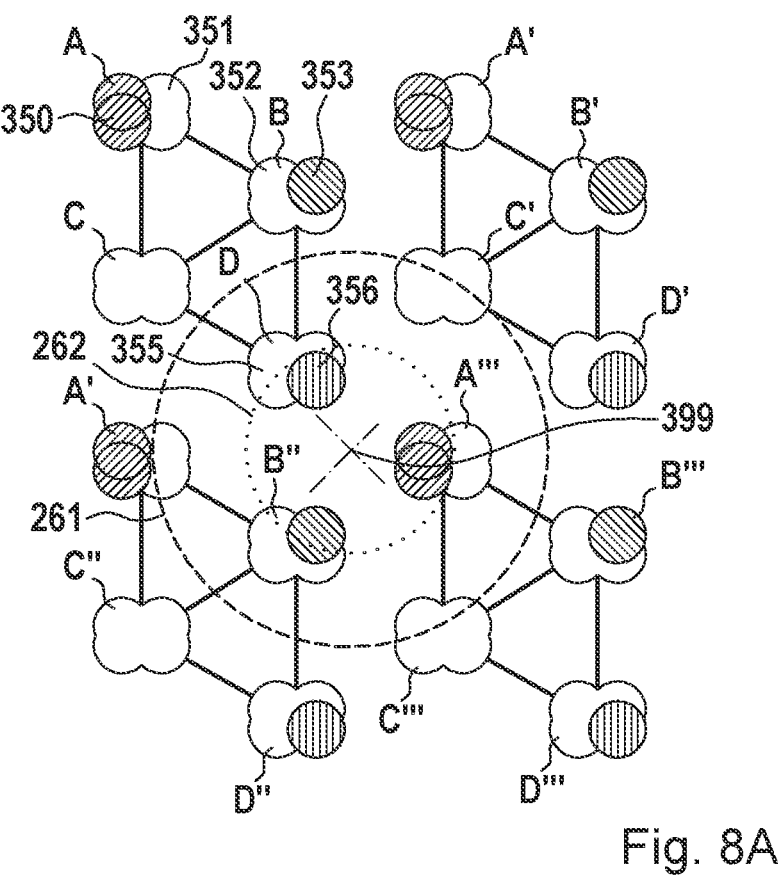
FIGS. 8A, 9A, and 10A show different positions of the pupil center and the resulting different active portions of a diamond-shaped arrangement of eye boxes when the eye is located in front of the exit pupil plane of the optical system, according to an example embodiment of the present invention.
Figure 8B:
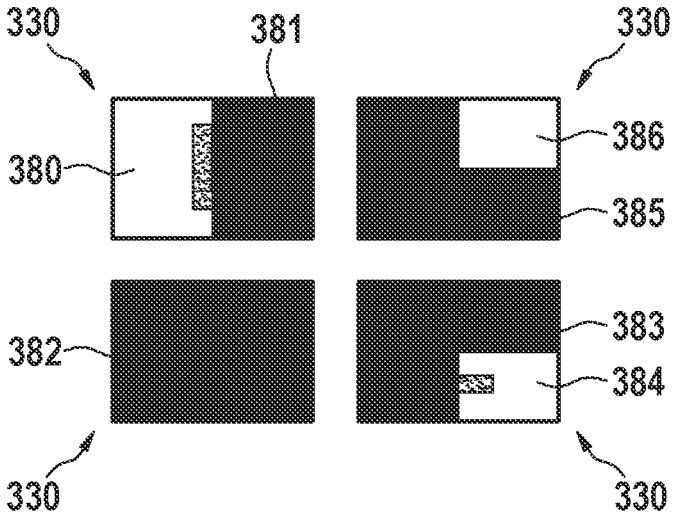
FIGS. 8B, 9B, and 10B show the associated subsets of the image data, according to an example embodiment of the present invention.

FIGS. 8A to 10B show a different parallelogram-shaped, in particular diamond-shaped, arrangement of the eye boxes A, B, C, D, A', B', C', D', A", B", C", D", A''', B''', C''' and D" in comparison with FIGS. 5A to 7B. In accordance with the arrangement of the pupil center 399 relative to the eye boxes A, B, C, D, A', B', C', D', A", B", C", D", A''', B''', C''' and D" in FIG. 8A, FIG. 8B shows a first subset 381 of the image data 330 blanked such that the generated active second subset 281 of image data has the in particular left half of the total amount of the image data. In addition, a third subset 385 of the image data 330 is blanked such that the thus generated active fourth subset 386 of image data has an in particular upper right quarter of the total amount of the image data 330. A seventh subset 383 of the image data 330 is likewise blanked such that the thus generated active eighth subset 384 of image data has an in particular lower right quarter of the total amount of the image data 330. The fifth subset 382 of the image data comprises the total amount of the image data 330. Thus, only subregions 350, 353 and 356 of the eye boxes A, A', A", A''', B, B', B", B''', D, D', D" and D''' are activated. In contrast, further subregions 351, 352 and 355 of the eye boxes A, A', A", A''', B, B', B", B''', D, D', D" and D''', as well as the complete eye boxes C, C', C" and C''', are deactivated.

Figure 9A:
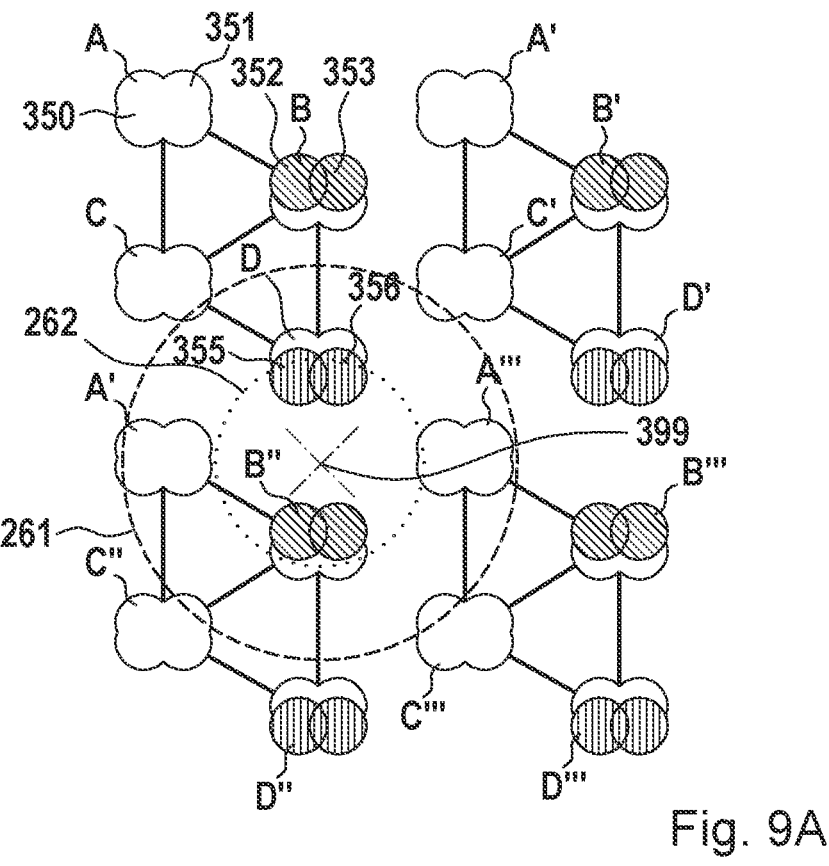
Figure 9B:
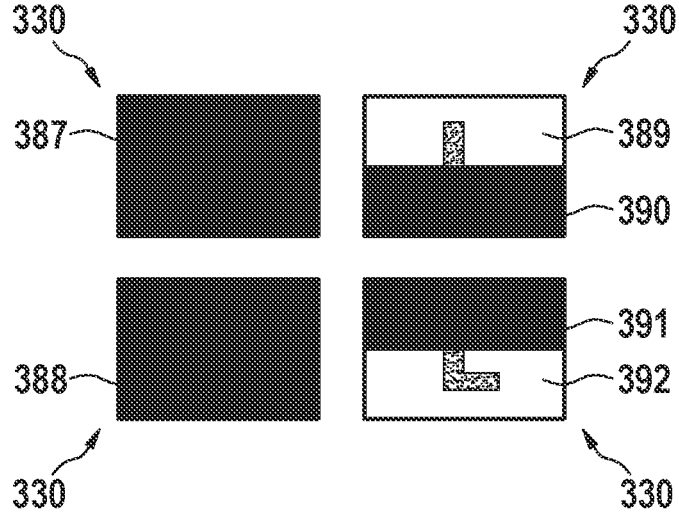

FIGS. 9A and 9B show a different position of the pupil center 399 relative to the generated exit pupils A, B, C, D, A', B', C', D', A", B", C", D", A''', B''', C''' and D''' in comparison with the previous figures. In this case, the pupil center 399 has the same, shortest distance from the eye boxes B" and D. In this case, both the first subset 387 and the fifth subset 388 correspond to the total amount of the image data 330. The third subset 389 of the image data 330 is selected such that an active fourth subset 390 of image data corresponds to an in particular upper half of the image data 330. The seventh subset 391 of the image data 330 is selected such that an active eighth subset 392 of image data corresponds to an in particular lower half of the image data 330. Thus, only the subregions 361 and 364 of the eye boxes B, B', B", B''', D, D', D" and D''' are activated. In contrast, further subregions 360 and 362 of the eye boxes B, B', B", B''', D, D', D" and D''', as well as the complete eye boxes A, A', A", A''', C, C', C" and C''', are deactivated.

Figure 10A:
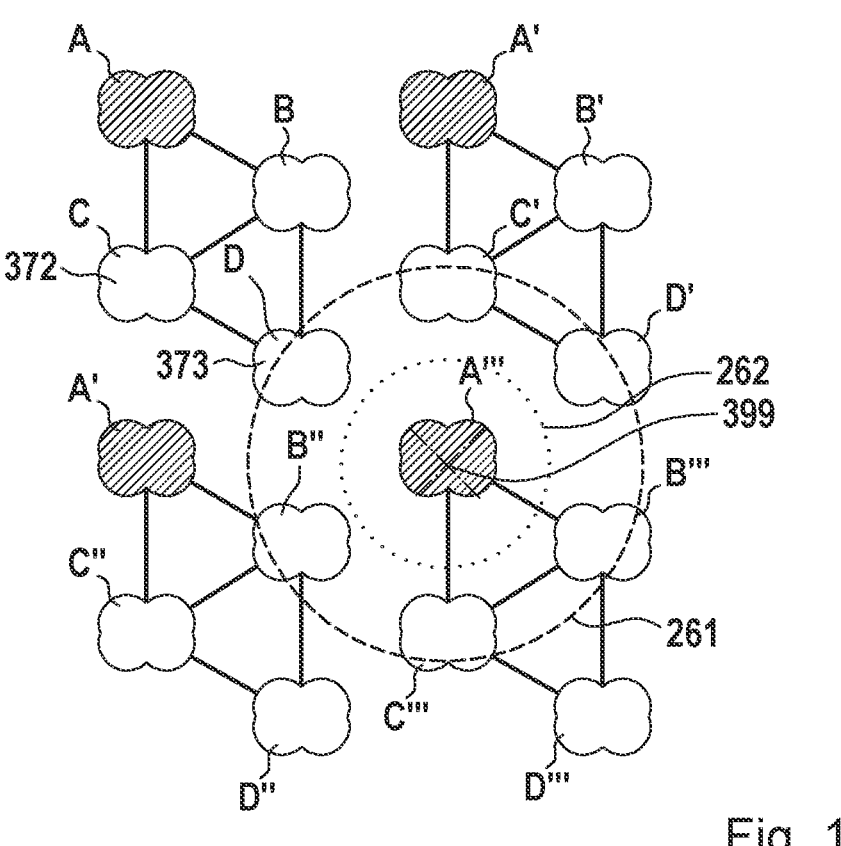
Figure 10B:
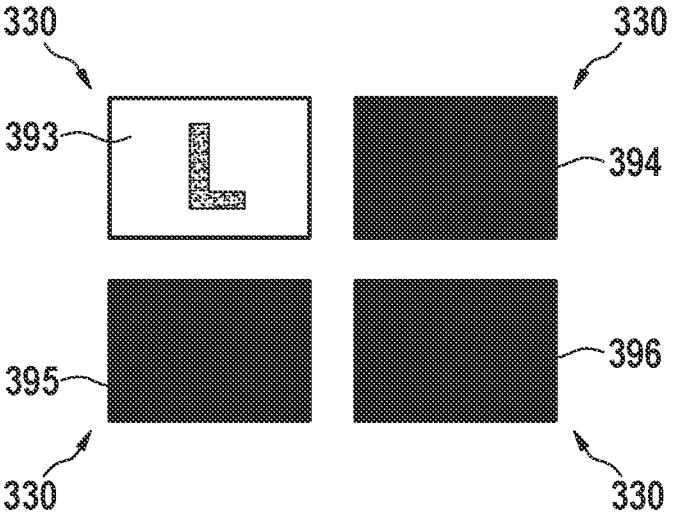

FIGS. 10A and 10B show a different position of the pupil center 399 relative to the generated exit pupils A, B, C, D, A', B', C', D', A", B", C", D", A'", B'", C'" and D'" in comparison with the previous figures. In this case, the pupil center 399 is arranged centrally, in particular in the middle, within the eye box A'". In this case, the second subset 393 corresponds to the total amount of the image data. The third subset 394, fifth subset 395 and seventh subset 396 also correspond to the total amount of the image data. Thus, only the eye boxes A, A', A" and A'" are fully activated. The eye boxes B, B', B", B'", C, C', C", C'", D, D', D" and D'" are, in contrast, completely deactivated.

Figure 11:
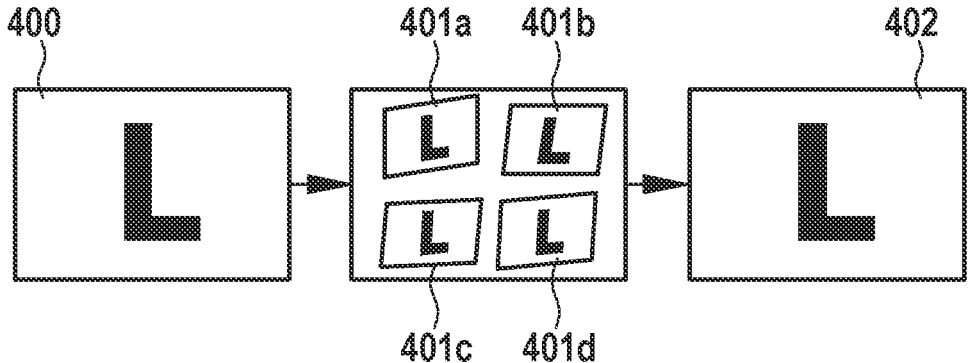
FIG. 11 shows the predistortion of the image data, according to an example embodiment of the present invention.

FIG. 11 schematically shows the optional method step of predistorting the image data by means of the image processing device, so that a distortion of the image content via the four different imaging paths in this case is at least partially compensated for. The image data 400 captured by means of the image processing device (not shown here) are then completely copied three times and predistorted. The predistorted image data 401$a$, 401$b$, 401$c$ and 401$d$ are subsequently used for controlling the projector unit (not shown here) and then reproduced on the eye pupil plane. The undistorted image 402 is displayed to the user.

The invention claimed is:

1. A method for projecting image content onto a retina of a user using an optical system, the image system including:

an image source which is configured to supply image content in the form of image data, an image processing device for the image data, a projector unit with a temporally modulatable light source configured to generate at least one light beam and with a controllable deflection devicefor the at least one light beam for scanning projection of the image content, a redirection unit onto which the image content can be projected and which is configured to direct the projected image content onto an eye of the user, an optical segmentation element, which is arranged between the projector unit and the redirection unit and is configured to project the image content via at least two different imaging paths onto at least one projection region of the redirection unit, wherein at least some of the imaging paths are individually controllable, and an optical replication component, which is arranged in the at least one projection region of the redirection unit and is configured to direct the projected image content in a replicated and spatially offset manner onto the eye of the user, so that a plurality of mutually spatially offset eye boxes with the image content is generated, wherein the method comprises the following steps:

capturing the image data using the image processing device;

blanking at least one first subset of the image data thereby generating an active second subset of the image data, wherein the first subset of the image data and the active second subset of the image data make up a total amount of the image data; and controlling the projector unit using the blanked first subset of the image data and active second subset of of the image data such that there is always only one eye box, generated on a common imaging path, with the same active image data arranged in a region of a first pupil region of the user, wherein the first pupil region surrounds a pupil center, and at least a portion of the eye box is arranged with at least a portion of the active image data within a second pupil region of the user, wherein the second pupil region surrounds the pupil center, wherein the second pupil region is arranged within the first pupil region.

2. The method according to claim 1, further comprising:

blanking at least one third subset of the image data, thereby generating an active fourth subset of the image data, wherein the third subset of the image data and the active fourth subset of the image data make up the total amount of the image data, wherein the active second subset of the image data and the active fourth subset of the image differ at least partially from one another.

3. The method according to claim 2, wherein the first subset of the image data, the active second subset of the image data, the third subset of the image data, and the active fourth subset of the image data enable a projection of at least a portion of the image content via at least four different imaging paths using the optical segmentation element onto at least one projection region of the redirection unit.

4. The method according to claim 3, further comprising:

blanking at least one fifth subset of the image data, thereby generating an active sixth subset of the image data, wherein the fifth subset of the image data and the active sixth subset of the image data make up the total amount of the image data; and blanking at least one seventh subset of the image data, thereby generating an active eighth subset of the image data, wherein the seventh subset of the image data and the active eighth subset of the image data make up the total amount of the image data, wherein the active second subset of the image data, the active fourth subset of the image data, the active sixth subset of the image data, and the active eighth subset of the image data differ at least partially from one another.

5. The method according to claim 4, wherein all active subsets of the image data includig the active second subset of the image data, the active fourth subset of the image data, the active sixth subset of the image data, and the active eighth subset of the image data, together make up at least the complete image content.

6. The method according to claim 5, wherein all active subsets of the image data together make up more than the complete image content.

7. The method according to claim 6, wherein the active subsets of the image data at least partially overlap.

8. The method according to claim 7, further comprising:

adjusting a brightness of the active subsets of the image data in an overlap region of the active subsets of the image data such that a distribution of a brightness of the projected image content is substantially uniform.

9. The method according to claim 1, wherein the first pupil region has a largest assumed pupil diameter of the user.

10. The method according to claim 1, wherein the second pupil region has a smallest assumed pupil diameter of the user.

11. The method according to claim 1, wherein the blanked first subset of the image data is selected such that the generated active second subset of the image data includes at least the image data with image content situated closest to the pupil center in the plurality of mutually spatially offset eye boxes, on an eye pupil plane.

12. The method according to claim 4, wherein, depending on a position of the pupil center of the user relative to the generated eye boxes, at least two of the blanked first, third, fifth, and seventh subsets of the image data are substantially the same size.

13. The method according to claim 12, wherein, depending on the pupil position of the user, the second active subset, fourth active subset, sixth active subset, and eighth active subset each correspond to a quarter of a total amount of the image data.

14. The method according to claim 1, wherein, using the optical segmentation element and the optical replication component, the plurality of eye boxes is generated such that the eye boxes are arranged in a grid.

15. The method according to claim 14, wherein the eye boxes are arranged in a rectangle shape or a parallelogram shape or a diamond shape in which two internal angles have an angle size of 60°.

16. The method according to claim 1, further comprising:

predistorting the image data using the image processing device such that a distortion of the image content via the at least two imaging paths is at least partially compensated for.

17. The method according to claim 16, wherein the predistortion and the blanking of the image data are carried out simultaneously.

18. The method according to claim 1, wherein a position of the pupil center of the user relative to the generated eye boxes is detected using an eye tracker.

19. An image processing device, configured to:

capture image data;

blank at least one first subset of the image data, thereby generating an active second subset of the image data, wherein the first subset of the image data and the active second subset of the image data make up the total amount of the image data; and control a projector unit using the blanked first subset of the image data and the active second subset of the image data such that there is always only one eye box generated on a common imaging path, with the same active image data arranged in a region of a first pupil region of the user, wherein the first pupil region surrounds a pupil center, and at least a portion of the eye box is arranged with at least a portion of the active image data within a second pupil region of the user, wherein the second pupil region surrounds the pupil center, wherein the second pupil region is arranged within the first pupil region.

20. An optical system for a virtual retinal scan display, comprising:

an image source, which supplies image content in the form of image data, an image processing device for the image data;

a projector unit with a temporally modulatable light source configured to generate at least one light beam and with a controllable deflection device for the at least one light beam for scanning projection of the image content;

a redirection unit onto which the image content can be projected and which is configured to direct the projected image content onto an eye of a user;

an optical segmentation element, which is arranged between the projector unit and the redirection unit and is configured to project the image content via at least two different imaging paths onto at least one projection region of the redirection unit, wherein at least some of the imaging paths are individually controllable; and an optical replication component, which is arranged in the at least one projection region of the redirection unit and is configured to direct the projected image content in a replicated and spatially offset manner onto the eye of the user, so that a plurality of mutually spatially offset eye boxes with the image content is generated;

wherein the image processing unit is configured to:

capture the image data, blank at least one first subset of the image data, thereby generating an active second subset of the image data, wherein the first subset of the image data and the active second subset of the image data make up the total amount of the image data, and control the projector unit using the blanked first subset of the image data and the active second subset of the image data such that there is always only one eye box generated on a common imaging path, with the same active image data arranged in a region of a first pupil region of the user, wherein the first pupil region surrounds a pupil center, and at least a portion of the eye box is arranged with at least a portion of the active image data within a second pupil region of the user, wherein the second pupil region surrounds the pupil center, wherein the second pupil region is arranged within the first pupil region.

21. The optical system according to claim 20, further comprising smart glasses with a spectacle frame and spectacle lenses, wherein the projector unit and the optical segmentation element are arranged on the spectacle frame, and the redirection unit is arranged with the optical replication component integrated into at least one spectacle lens.

* * * * *